(12) United States Patent
Kwon et al.

(10) Patent No.: US 11,188,796 B2
(45) Date of Patent: Nov. 30, 2021

(54) METHOD AND APPARATUS WITH DATA PROCESSING

(71) Applicant: Samsung Electronics Co., Ltd., Suwon-si (KR)

(72) Inventors: Donghyuk Kwon, Seoul (KR); Seungwon Lee, Nonsan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 55 days.

(21) Appl. No.: 16/804,672

(22) Filed: Feb. 28, 2020

(65) Prior Publication Data

US 2021/0097347 A1    Apr. 1, 2021

(51) Int. Cl.
*G06K 9/62* (2006.01)
*G06N 3/04* (2006.01)
*G06N 3/08* (2006.01)

(52) U.S. Cl.
CPC ......... *G06K 9/6262* (2013.01); *G06K 9/6232* (2013.01); *G06N 3/04* (2013.01); *G06N 3/08* (2013.01)

(58) Field of Classification Search
CPC ...... G06K 9/6262; G06K 9/6232; G06N 3/04; G06N 3/08; G06N 3/063; G06N 3/0454
USPC ........................................................ 382/157
See application file for complete search history.

(56) References Cited

U.S. PATENT DOCUMENTS

| | | | |
|---|---|---|---|
| 9,786,036 B2* | 10/2017 | Annapureddy | G06K 9/4623 |
| 2012/0166374 A1* | 6/2012 | Moussa | G06N 3/063 |
| | | | 706/16 |
| 2018/0129893 A1 | 5/2018 | Son et al. | |
| 2018/0189643 A1 | 7/2018 | Kim et al. | |
| 2018/0204110 A1 | 7/2018 | Kim et al. | |
| 2019/0080239 A1 | 3/2019 | Yang | |
| 2019/0102640 A1 | 4/2019 | Balasubramanian | |
| 2019/0311258 A1* | 10/2019 | Zhang | G06N 3/08 |
| 2020/0184245 A1* | 6/2020 | Huang | G06N 3/0454 |
| 2020/0184320 A1* | 6/2020 | Croxford | G06N 3/063 |
| 2020/0226451 A1* | 7/2020 | Liu | G06N 3/063 |
| 2020/0242353 A1* | 7/2020 | Zhang | G06K 9/4628 |
| 2021/0011288 A1* | 1/2021 | Lai | G02B 27/0172 |
| 2021/0081798 A1* | 3/2021 | Cho | G06N 3/0454 |

FOREIGN PATENT DOCUMENTS

| | | |
|---|---|---|
| CN | 109002885 A | 12/2018 |
| KR | 10-2018-0050928 A | 5/2018 |
| KR | 10-2018-0080876 A | 7/2018 |

OTHER PUBLICATIONS

Kala, S., et al. "UniWiG: Unified winograd-GEMM architecture for accelerating CNN on FPGAs." *2019 32nd International Conference on VLSI Design and 2019 18th International Conference on Embedded Systems (VLSID)*. IEEE, 2019 (6 pages in English).

(Continued)

*Primary Examiner* — Juan A Torres

(74) *Attorney, Agent, or Firm* — NSIP Law

(57) ABSTRACT

A processor-implemented data processing method includes: predicting whether there will be an inefficient section, of a neural network set to be implemented, during a processing of data, based on a hardware configuration for processing the data; adjusting a layer parameter corresponding to the inefficient section of the neural network; and processing the data using the neural network with the adjusted layer parameter.

29 Claims, 10 Drawing Sheets

(56) References Cited

OTHER PUBLICATIONS

Yang, Chen, et al. "WRA: A 2.2-to-6.3 TOPS highly unified dynamically reconfigurable accelerator using a novel Winograd decomposition algorithm for convolutional neural networks." *IEEE Transactions on Circuits and Systems I: Regular Papers* 66.9 (2019): 3480-3493 (14 pages in English).

Extended European search report issued by the European Patent Office dated Nov. 6, 2020 in counterpart of the European Patent Application No. 20174104.8 (12 pages in English).

\* cited by examiner

METHOD AND APPARATUS WITH DATA PROCESSING

CROSS-REFERENCE TO RELATED APPLICATION

This application claims the benefit of Korean Patent Application No. 10-2019-0121736, filed on Oct. 1, 2019, in the Korean Intellectual Property Office, the disclosure of which is incorporated herein in its entirety by reference.

BACKGROUND

1. Field

The present disclosure relates to a methods and apparatuses with data processing.

2. Description of Related Art

Neural network devices may be used in various types of electronic systems to analyze input data and extract valid information.

However, typical neural network devices may not efficiently perform a large amount of operations on input data.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented data processing method includes: predicting whether there will be an inefficient section, of a neural network set to be implemented, during a processing of data, based on a hardware configuration for processing the data; adjusting a layer parameter corresponding to the inefficient section of the neural network; and processing the data using the neural network with the adjusted layer parameter.

The hardware configuration may correspond to a data size of a memory.

The data size of the memory may include a set number of tile data blocks.

The inefficient section may correspond to a layer of the neural network in which a data size of a generated feature map exceeds the set data size of the set number of tile data blocks.

The layer parameter may include any one or any combination of any two or more of a size of kernel data, a corresponding number of paddings, and a corresponding number of strides.

The adjusting of the layer parameter may include adjusting the layer parameter by increasing a size of kernel data corresponding to the inefficient section.

The increasing of the size of the kernel data may include increasing the size of the kernel data by performing zero padding on the kernel data.

The adjusting of the layer parameter may include adjusting the layer parameter by decreasing a number of paddings of feature map data, to be input to a next layer of the neural network, corresponding to the inefficient section.

The adjusting of the layer parameter may include adjusting the layer parameter by increasing a number of strides for convolution of feature map data corresponding to the inefficient section.

The predicting of whether there will be the inefficient section during processing of the data may include determining whether there will be the inefficient section based on predetermined layer parameters including the layer parameter, and each of the predetermined layer parameters may correspond to a respective layer among layers of the neural network at which the data is to be processed.

The predicting of whether there will be the inefficient section during processing of the data may include determining whether there will be the inefficient section based on a determined number of operation cycles at each of the layers.

The method may include determining whether a processing of the data in the inefficient section is improved based on the processing of the data with the adjusted layer parameter.

The determining of whether the processing of the data in the inefficient section is improved may include comparing: a first number of operation cycles to process the data in one or more layers of the neural network using the layer parameter; and a second number of operation cycles to process the data in the one or more layers of the neural network with the adjusted layer parameter.

The determining of whether the processing of the data in the inefficient section is improved may include determining the processing of the data in the inefficient section is improved in response to the first number of operation cycles being greater than the second number of operation cycles.

The data may include feature map data corresponding to an input image, and the processing of the data may include identifying features of the input image by performing a convolution operation with the adjusted layer parameter.

A non-transitory computer-readable storage medium may store instructions that, when executed by one or more processors, configure the one or more processors to perform the method.

In another general aspect, a data processing apparatus includes: one or more processors configured to predict whether there will be an inefficient section, of a neural network set to be implemented, during a processing of data, based on a hardware configuration for processing the data, adjust a layer parameter corresponding to the inefficient section of the neural network, and process the data using the neural network with the adjusted layer parameter.

The hardware configuration may correspond to a data size of a memory.

The layer parameter may include any one or any combination of any two or more of a size of kernel data, a number of paddings, and a number of strides.

For the adjusting of the layer parameter, the one or more processors may be configured to adjust the layer parameter by increasing a size of kernel data corresponding to the inefficient section.

For the increasing of the size of the kernel data, the one or more processors may be configured to increase the size of the kernel data by performing zero padding on the kernel data.

For the adjusting of the layer parameter, the one or more processors may be configured to adjust the layer parameter by decreasing a number of paddings of feature map data corresponding to the inefficient section.

For the adjusting of the layer parameter, the one or more processors may be configured to adjust the layer parameter by increasing a number of strides of feature map data corresponding to the inefficient section.

For the predicting of whether there will be the inefficient section, the one or more processors may be configured to determine whether there will be the inefficient section based on predetermined layer parameters including the layer parameter, and each of the predetermined layer parameters may correspond to a respective layer among layers of the neural network at which the data is to be processed.

For the predicting of whether there will be the inefficient section, the one or more processors may be configured to determine whether there will be the inefficient section based on a determined number of operation cycles at each of the layers.

The one or more processors may be configured to determine whether the processing of the data in the inefficient section is improved based on the processing of the data with the adjusted layer parameter.

The apparatus may be any one of a personal computer (PC), a server device, a mobile device, a smart phone, a tablet device, an augmented reality (AR) device, an internet-of-things (IoT) device, an autonomous vehicle, a robotics device, and a medical device, and the one or more processors may be configured to perform any one of voice recognition, vision recognition, and image classification based on a result of the processing of the data.

The apparatus may include a memory storing instructions that, when executed by the one or more processors, configure the one or more processors to perform the predicting of whether the inefficient section will be generated, the adjusting of the neural network layer parameter, and the processing of the data.

In another general aspect, a processor-implemented data processing method includes: predicting whether an inefficient section will be generated during a processing of data in a layer of a neural network, based on a determined number of operation cycles for the processing of the data in the layer; in response to predicting the inefficient section will be generated, adjusting a parameter of the layer, such that a data size of a feature map generated in the layer based on the data does not exceed a data size of a set number of tile data blocks in a memory; and processing the data in the layer with the adjusted layer parameter to generate the feature map.

Other features and aspects will be apparent from the following detailed description, the drawings, and the claims.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
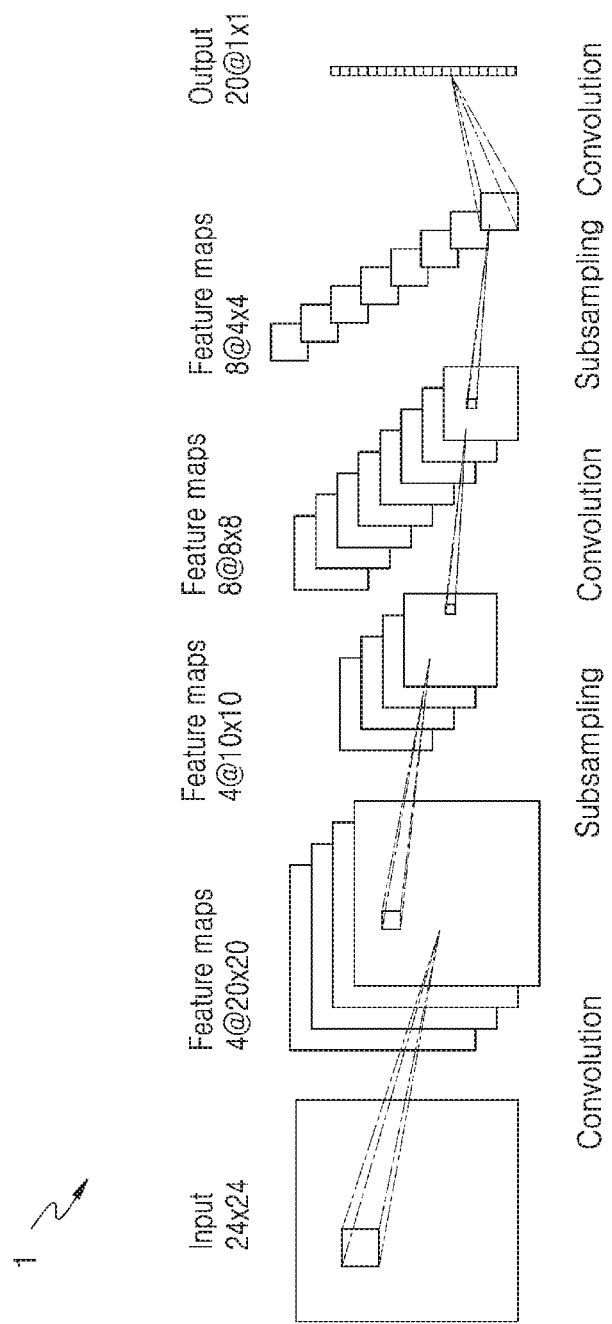
FIG. 1 illustrates an architecture of a neural network according to one or more embodiments.

Reference will now be made in detail to embodiments, examples of which are illustrated in the accompanying drawings, wherein like reference numerals refer to like elements throughout. In this regard, one or more embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

In the embodiments, general terms that have been widely used nowadays are selected, when possible, but non-general terms may be selected according to the intentions of technicians in this art, precedents, or new technologies, etc. Some terms may be arbitrarily chosen by the present applicant. In this case, the meanings of these terms will be explained in corresponding parts of the disclosure in detail. Thus, the terms used herein should be defined not based on the names thereof but based on the meanings thereof and the whole context of the present specification.

It will be understood that when an element is referred to as "including" another element, the element may further include other elements unless mentioned otherwise. Terms such as "unit", "module," and the like, when used herein, represent hardware configured to process data either through hardware alone or through a combination of hardware and software.

Embodiments will be described in detail with reference to the accompanying drawings below. However, embodiments may be embodied in many different forms and thus are not limited to examples provided herein.

Hereinafter, embodiments will be described in detail with reference to the accompanying drawings.

FIG. 1 illustrates an architecture of a neural network according to one or more embodiments.

Referring to FIG. 1, a neural network 1 may be an architecture of a deep neural network (DNN) or an n-layer neural network. The DNN or the n-layer neural network may correspond to a convolutional neural network (CNN), a recurrent neural network (RNN), a deep belief network, a restricted Boltzmann machine, or the like. For example, the neural network 1 may be embodied as a CNN but is not limited thereto. Although FIG. 1 illustrates some convolutional layers of the CNN as an example of the neural network 1, the CNN may further include a pooling layer, a fully connected layer, and the like, as well as the convolutional layers.

Thus, as illustrated, the neural network 1 may be embodied as an architecture with multiple layers, including an input image layer, feature map generating layers, and output data layer. In the neural network 1, a convolution operation may be performed on the input image with a filter called a kernel, and as a result, feature maps (or activation maps or convolved features) may be output. A convolution operation may be performed again on the output feature maps serving as input feature maps to the next convolution layer and convolution performed according to a next kernel, which results in new feature maps may be output as new output feature maps. As a result of repeatedly performing such convolution operation with respective kernels, a result of identifying features of the input image through the neural network 1 may be finally output.

For example, when a 24×24 pixel image is input to the neural network 1 of FIG. 1, a first convolution operation may be performed on the input image with a first kernel and thus four-channel 20×20 pixel feature maps may be output. Thereafter, respective convolution operations may be performed dependent on the output 20×20 feature maps with respective kernels to incrementally reduce the size of the respectively output feature maps, with a final illustrated convolution operation with a final kernel generating the illustrated final features of a 1×1 pixel size. Through the neural network 1, the convolution operations and a sub-sampling (or pooling) operations may be respectively performed through several layers, and the final filtered result may be output with robust features that may represent an entire image. A result of identifying the input image may be derived from the output features, for example, in an embodiment. Based on the above, it is understood that example embodiments discussed herein include embodiments with one or more, in various combinations, or all such layers, stages, edges, etc. in operations of the neural network 1.

Figure 2:
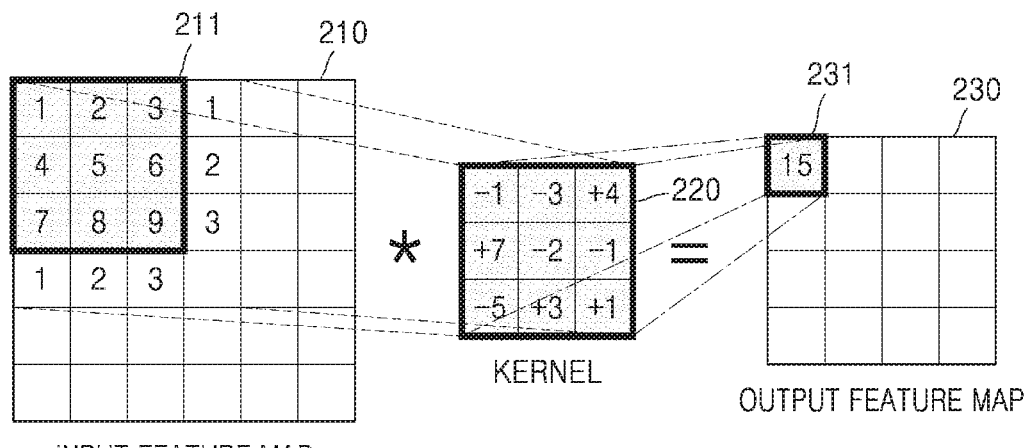
FIGS. 2 and 3 illustrate convolution operations of a neural network according to one or more embodiments.
Figure 2:
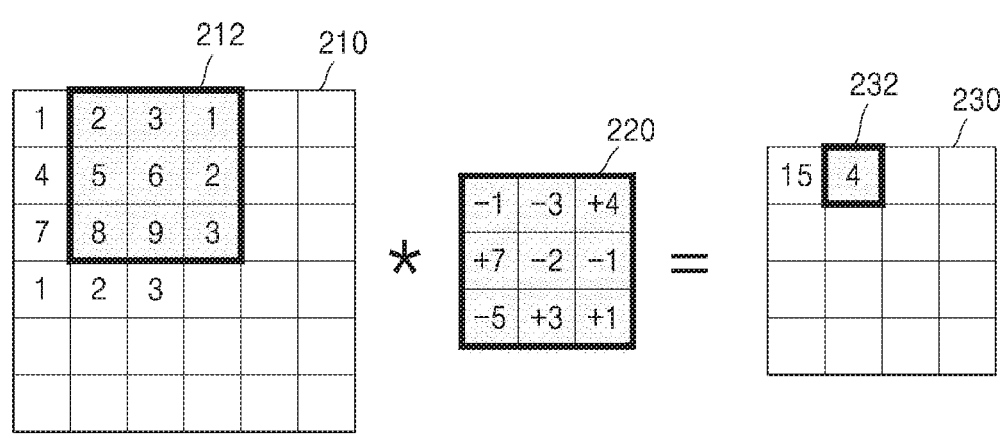
Figure 2:
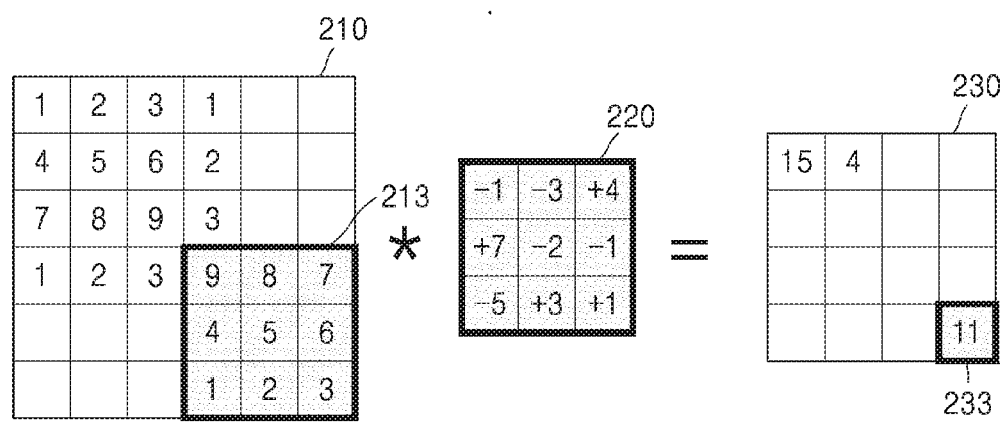
Figure 3:
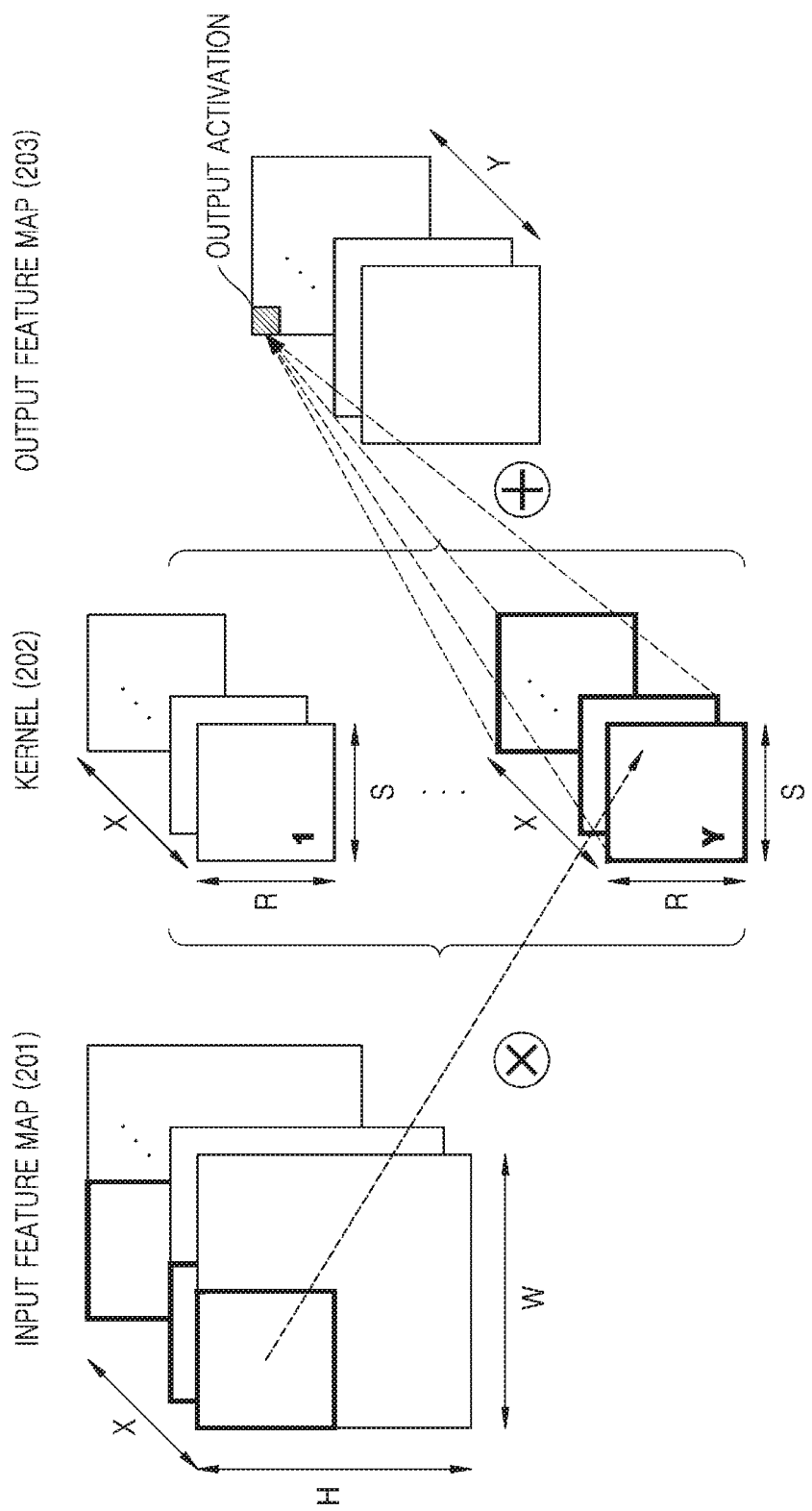

FIGS. 2 and 3 illustrates convolution operations of a neural network according to one or more embodiments.

In one or more embodiments, an input feature map 210 may have a 6×6 pixel size, a kernel 220 may have a 3×3 pixel size, and an output feature map 230 may have a 4×4 pixel size, as shown in the example of FIG. 2, but embodiments are not limited thereto, and the neural network may be implemented with feature maps and kernels of various sizes. The defined values of the input feature map 210, the kernel 220, and the output feature map 230, as shown in the example of FIG. 2, are examples only and thus embodiments are not limited thereto. Each pixel of the input feature map may include a pixel value, for example.

The kernel 220 may be used to perform the convolution operation on the input feature map 210 while sliding the kernel 220 in units of regions (or tiles) across the input feature map 210. The convolution operation may refer to an operation of multiplying each pixel value of a region of the input feature map 210 by a corresponding weight, which is an element of the kernel 220, and adding values obtained by the multiplication together to calculate each pixel value of the output feature map 230.

For example, first, a convolution operation may be performed between the kernel 220 and a first region 211 of the input feature map 210. For example, pixel values 1, 2, 3, 4, 5, 6, 7, 8, and 9 of the first region 211 may be respectively multiplied by weights −1, −3, +4, +7, −2, −1, −5, +3, and +1 that are elements of the kernel 220, to obtain values −1, −6, 12, 28, −10, −6, −35, 24, and 9. Next, the obtained values 1, −6, 12, 28, −10, −6, −35, 24, and 9 may be added together to obtain a value of 15, and thus a pixel value 231 of a corresponding first row and first column of the output feature map 230 may be determined to be the value of 15. Here, the pixel value 231 of the first row and the first column of the output feature map 230 may correspond to the first region 211.

In a similar manner as described above, a convolution operation may be performed between a second region 212 of the input feature map 210 and the kernel 220, and thus a pixel value 232 of the corresponding first row and a second column of the output feature map 230 may be determined to be 4. The convolution operations may be respectively performed between first through sixteenth regions of the input feature map and the kernel 220 such that pixel values for each position of the output feature map 230 are determined. For example, a convolution operation may be performed between a sixteenth region 213 (which is a last window of the input feature map 210 and the kernel 220), and thus a pixel value 233 of a corresponding fourth row and fourth column of the output feature map 230 may be determined to be 11. That is, the convolution operations between the input feature map 210 and the kernel 220 may be performed by repeatedly processing multiplications of values of elements corresponding to each other in the input feature map 210 and the kernel 220 and the sum of multiplication results, and the output feature map 230 may be generated as a result of the convolution operations.

Although a two-dimensional (2D) convolution operation has been described above with reference to FIG. 2, the convolution operation may be a three-dimensional (3D) convolution operation in which the output feature map has a plurality of channels dependent on the corresponding number of 2D or 3D kernels applied against the input feature map. The input feature maps and the respective number of kernels may also each have plural channels. An example of the 3D convolution operation will be described with reference to FIG. 3 below.

Referring to FIG. 3, an input feature map 201 may have a 3D size (or volume) and include X input channels, where the 2D input feature map of each of the X input channels may have a size of H rows and W columns (wherein, X, W, and H are natural numbers). A kernel 202 may have a four-dimensional (4D) size. For example, a fourth dimension of the kernel 202 may also be referred to as a number of 3D kernels, e.g., Y 3D kernels resulting in Y output feature map channels. The 4D kernel may also be referred to as including a number of 3D kernels each having a size of R rows and S columns and a depth corresponding to the X input channels (wherein, R, S, and Y are natural numbers). For example, the kernel 202 may have channels (or depths) of a number corresponding to (e.g., equaling) the number of the input channels X of the input feature map 201. As noted, the 2D kernel corresponding to each of these channels may have a size of R rows and S columns. The output feature map 203 may be generated by performing the 3D convolution operation between the 3D input feature map 201 and the 4D kernel 202 (or each of the R×S×X 3D kernels of the kernel 202), generating Y channels as a result of performing the 3D convolution operations.

A process of generating an output feature map by performing the convolution operation between each 2D input feature map and each 2D kernel may be as described above with reference to FIG. 2. The output feature map with Y output channels may be generated by repeatedly performing 2D convolution operations described above with reference to FIG. 2 on the input feature map 201 with the X input channels and the kernel 202 with the X input channels and the Y output channels. Based on the above, it is understood that example embodiments discussed herein may include embodiments with one or more, in various combinations, or all channels X in an input feature map and/or channels Y of an output feature map.

Figure 4:
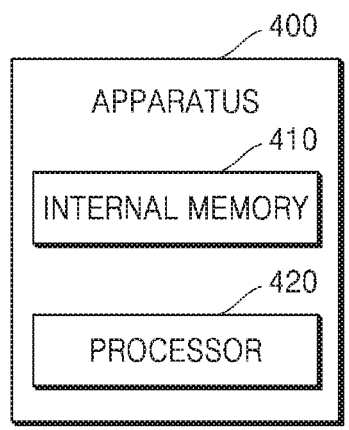
FIG. 4 illustrates a data processing apparatus according to one or more embodiments.

FIG. 4 illustrates a data processing apparatus according to one or more embodiments.

Referring to FIG. 4, a m 400 may include an internal memory 410 and a processor 420. It will be understood to one of ordinary skill in the art after an understanding of the present disclosure that the data processing apparatus 400 may further include other general-purpose components in addition to the components illustrated in FIG. 4.

The data processing apparatus 400 may be an apparatus configured to implement the example neural networks described above with reference to FIGS. 1 to 3. For example, the data processing apparatus 400 may be embodied as one of various types of devices such as a personal computer (PC), a server device, a mobile device, and an embedded device. The data processing apparatus 400 may be included in and/or implemented as, but is not limited to, a smart phone, a tablet device, an Augmented Reality (AR) device, an Internet-of-Things (IoT) device, an autonomous vehicle, robotics, medical devices, or the like, which is capable of performing voice recognition, vision recognition, image classification, etc. using any one or any combination of the neural network layers and/or neural networks made up of one or more of the layers of nodal convolutional interactions discussed herein. Further, the data processing apparatus 400 may include a dedicated hardware accelerator (HW accelerator) installed in a device as described above, or may include a hardware accelerator for driving a neural network (e.g., a neural processing unit (NPU), a tensor processing unit (TPU), or a neural engine). The use of the term "may" herein with respect to an example or embodiment (e.g., as to what an example or embodiment may include or implement) means that at least one example or embodiment exists where such a feature is included or implemented, while all examples are not limited thereto.

The internal memory 410 may store various types of data processed by the data processing apparatus 400. For example, the internal memory 410 may store data processed by the data processing apparatus 400 and data to be processed by the data processing apparatus 400. In addition, the internal memory 410 may store applications, drivers, and the like to be driven by the data processing apparatus 400. For example, the internal memory 410 may be an on-chip memory having a cache function of processing the convolution operation.

For example, the internal memory 410 may include random access memory (RAM) such as dynamic random access memory (DRAM) or static random access memory (SRAM), read-only memory (ROM), electrically erasable programmable read-only memory (EEPROM), a hard disk drive (HDD), a solid-state drive (SSD), or flash memory.

The processor 420 may control overall functions for driving a neural network in the data processing apparatus 400. For example, the processor 420 may perform overall control of the data processing apparatus 400 by executing programs (or instructions) stored in the internal memory 410. The processor 420 may be embodied as, but is not limited to, a central processing unit (CPU), a graphics processing unit (GPU), an application processor (AP), or the like included in the data processing apparatus 400.

The processor 420 may read data (e.g., image data, feature map data, kernel data, and the like) from the internal memory 410, or write such data to the internal memory 410, and execute the neural network by using the read and/or written data. For example, when the neural network is implemented, parameters of the neural network are read from the internal memory 410, for example, and the processor 420 may drive logic circuits included therein to respectively perform the convolution operations between each kernel and each input or correspondingly generated feature maps for generating data regarding an output feature map. In this case, the amount of calculations of the convolution operations may be determined based on various factors such as the number of channels of the input feature maps, the number of channels of the kernel, the size of the input feature maps, the size of the kernel, a number of channels of the output feature map, and a degree of precision of each value.

For example, the processing units may include logic circuits configured for the convolutional operations. Specifically, the processing units may include operators which include a combination of a multiplier, an adder, and an accumulator. The multiplier may be embodied as a combination of multiple sub-multipliers, and similarly, the adder may be embodied as a combination of multiple sub-adders.

The processor 420 may further include a dispatcher for dispatching various operands such as pixel values of input feature map or weights of kernels. For example, the dispatcher may dispatch operands, such as pixel values and weights which are necessary for an operation to be performed by the processing units, to the internal memory 410 from data stored in the internal memory 410. Thereafter, the dispatcher may dispatch the operands dispatched in the internal memory 410 to the processing units for the convolution operation.

In a typical neural network apparatus, a large amount of calculations may be performed to process a neural network. However, a neural network apparatus of one or more embodiments may be configured to reduce the amount of calculations to process a neural network, thereby solving such a technological problem and providing a technological improvement by advantageously increasing a calculation speed of the neural network apparatus of one or more embodiments over the typical neural network apparatus. For example, the neural network apparatus of one or more embodiments may be configured to reduce the size of a neural network by changing the structure of the neural network to reduce the amount of calculations and/or quantizing the neural network for faster calculations.

The degree of optimization of an operation of a device implementing the neural network may be dependent on the hardware (e.g., a GPU, an NPU, or the like) utilized by the device. A tiling method is an example of maximizing recycling of a cache in a device for effective access to memory by hardware. However, when an operation of the neural network does not match a tiling condition, and thus the probability of occurrence of cache hits is low or utilization of memory is inefficient, overall utilization of hardware decreases, which may adversely affect processing of data by the device.

In an embodiment, the data processing apparatus 400 may modify the neural network adaptively to the data processing apparatus 400. For example, the processor 420 may optimize a size of data (e.g., feature map data or kernel data) to be processed by the data processing apparatus 400 to match a determined hardware configuration of the data processing apparatus 400.

The processor 420 may predict whether there is an inefficient section during processing of data, based on the hardware configuration, and adjusts a layer parameter related to the inefficient section. In addition, the processor 420 processes the data, based on the adjusted layer parameter.

As the processor 420 adjusts the layer parameter, the size of the data to be processed may be matched to the hardware configuration and thus the inefficient section (i.e., a section in which an operation is performed inefficiently) during the processing of the data may be improved. In addition, as the processor 420 adjusts the layer parameter, the same effect as when feature map data is cropped may be achieved.

Figure 5:
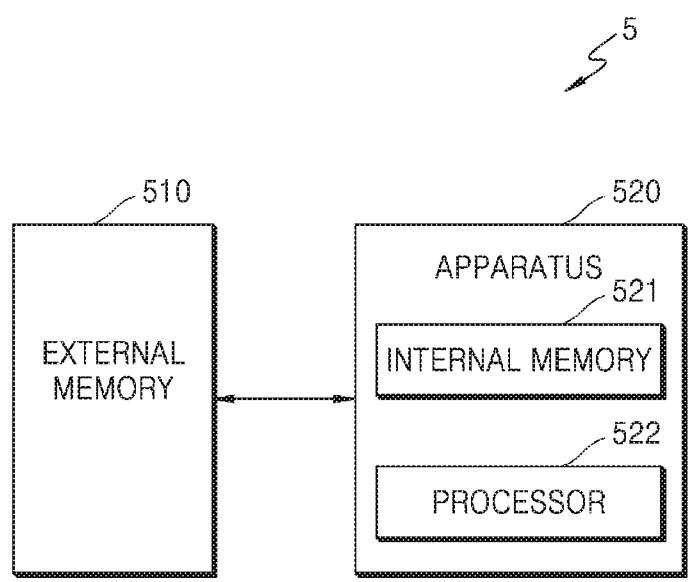
FIG. 5 illustrates a neural network system according to one or more embodiments.

FIG. 5 is a block diagram of an example of a neural network system.

Referring to FIG. 5, a neural network system 5 includes an external memory 510 and a data processing apparatus 520. The data processing apparatus 520 includes an internal memory 521 and a processor 522. The data processing apparatus 520 of FIG. 5 may correspond to the data processing apparatus 400 of FIG. 4, though examples are not limited thereto. Therefore, a detailed description of the data processing apparatus 520 will be omitted here.

Example components of the neural network system 5 related to an embodiment are illustrated in FIG. 5. It will be apparent to those of ordinary skill in the art that other components may be further included in the neural network system 5, as well as the components illustrated in FIG. 5.

The external memory 510 stores various types of data processed in the data processing apparatus 520. For example, the processor 522 may read data, which is to be processed, in a certain size from the external memory 510 and store the read data in the internal memory 521. In addition, the processor 522 may store processed data in the external memory 510 via the internal memory 521.

For example, the external memory 510 may include RAM such as DRAM or SRAM, ROM, EEPROM, an HDD, an SSD, or flash memory.

Non-limiting examples of adjusting a layer parameter and processing data, based on the adjusted layer parameter, will be described in greater detail with reference to FIGS. 6 to 11 below. The examples described below with reference to FIGS. 6 to 11 may be performed by a data processing apparatus (e.g., the data processing apparatus 400 or 520).

Figure 6:
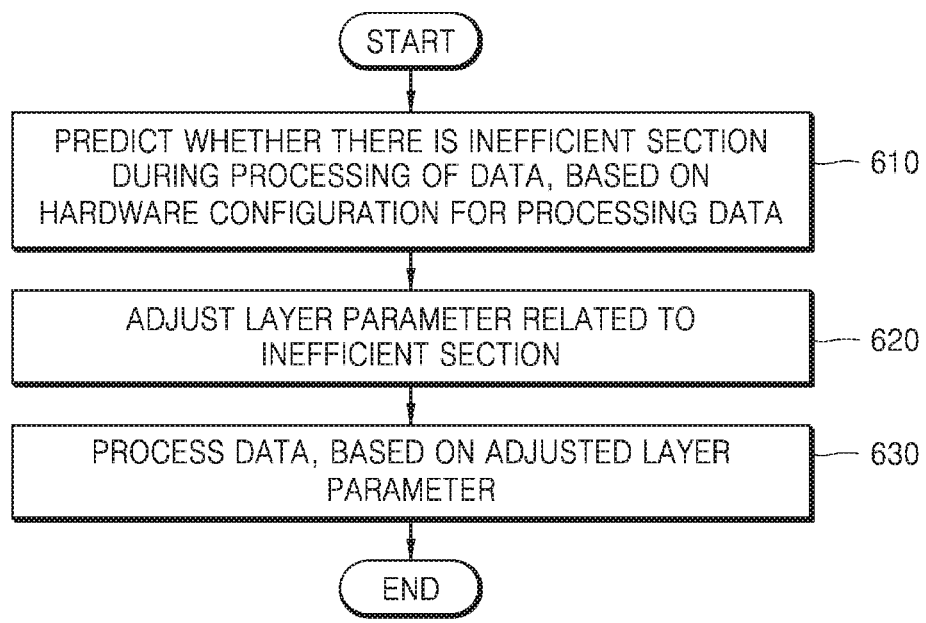
FIG. 6 illustrates a method of processing data according to one or more embodiments.

FIG. 6 illustrates a method of processing data according to one or more embodiments.

Referring to FIG. 6, the method of processing data may include operations performed in a time series by the data processing apparatus 400 of FIG. 4 or the data processing apparatus 520 of FIG. 5. Therefore, the above description of the data processing apparatuses 400 and 520 of FIGS. 4 and 5 may also apply to the method of processing data of FIG. 6.

In operation 610, the processor 420 or 522 may predict whether there is an inefficient section during processing of data, based on a determined hardware configuration for processing the data.

The hardware configuration may correspond to a size of data input to an internal memory (e.g., the internal memory 410 or 521). For example, the processor 420 or 522 may read data of a certain size from the external memory 510 and store the data in the internal memory 410 or 521. Here, the size of the data read from the external memory 510 may correspond to a size of a tile.

The processor 420 or 522 may use data stored in the internal memory 410 or 521 to process the data. For example, as the number of times the processor 420 or 522 recycles the data stored in the internal memory 410 or 521 increases, the number of times the processor 420 or 522 accesses the external memory 510 may decrease. Therefore, the speed of an operation of the data processing apparatus 400 or 520 may be increased. As described above, the storing of the data of the certain size in the internal memory 410 or 521 and the using (including recycling) of the stored data by the processor 420 or 522 may be referred to herein as a tiling method.

The processor 420 or 522 may predict whether there is an inefficient section during the processing of the data. Here, the inefficient section may be a section in which data processing (operation) is performed inefficiently and may be dependent on the size of data stored in the internal memory 410 or 521 (i.e., the size of a tile). For example, the processor 420 or 522 may identify a section with low possibility of recycling the data stored in the internal memory 410 or 521 as an inefficient section during the processing of the data.

When the processor 420 or 522 processes data corresponding to the neural network, the processor 420 or 522 may predict an inefficient section, based on a layer parameter for each of a plurality of layers of the neural network. Non-limiting examples in which a processor (e.g., the processor 420 or 522) predicts whether there is an inefficient section will be described in greater detail with reference to FIGS. 7 and 8 below.

Figure 7:
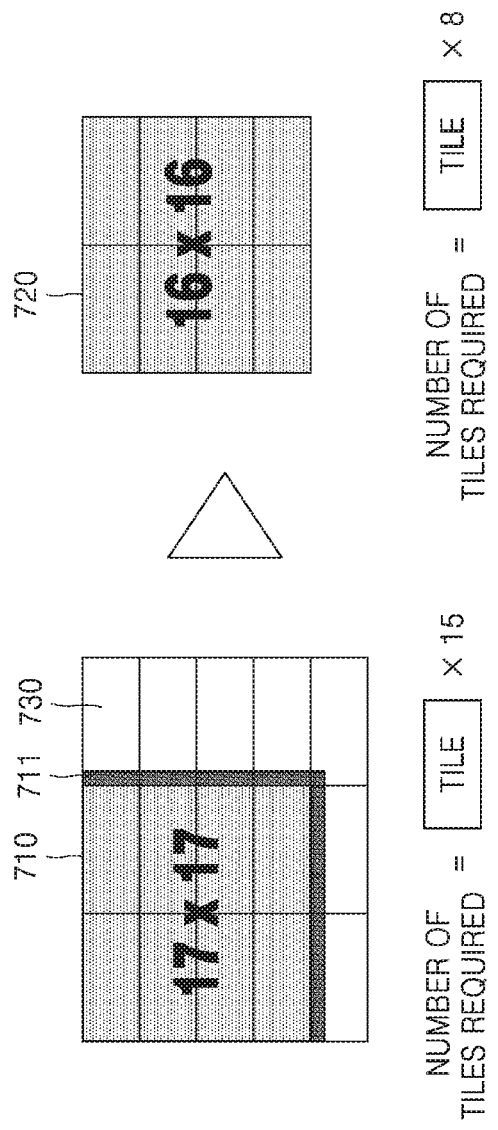
FIG. 7 illustrates an inefficient section and an efficient section according to one or more embodiments.

FIG. 7 illustrates an inefficient section and an efficient section according to one or more embodiments.

FIG. 7 illustrates data 710 input to a data processing apparatus (e.g., the data processing apparatus 400 or 520). Here, the data 710 may refer to data to be processed by the processor 420 or 522. For example, when the data processing apparatus 400 or 520 is an apparatus for implementing a neural network, the data 710 may be feature map data or kernel data. Fifteen tiles 730 are illustrated in FIG. 7. For example, the tiles 730 may be data that is stored in the internal memory 410 or 521 and is to be used to process the data 710.

Referring to FIG. 7, most of the data 710 overlaps eight tiles but a part 711 of the data 710 does not overlap the eight tiles. Thus, a minimum of fifteen total tiles entirely cover the data 710. That is, due to the part 711 of the data 710, the processor 420 or 522 may efficiently process the data 710 when data corresponding to fifteen tiles is stored in the cache. However, when the internal memory 410 or 521 is configured to store a predetermined amount of eight tiles due to a hardware configuration thereof, the number of operation cycles for processing the data 710 by the processor 420 or 522 will be greater than when processing data that may be covered by eight tiles.

FIG. 7 illustrates data 720 input to the data processing apparatus 400 or 520, wherein all the data 720 overlaps eight tiles.

Thus, the processor 420 or 522 may use less operation cycles to process the data 720 than to process the data 710, as the processor 420 or 522 may use eight tiles stored in the internal memory 410 or 521 to process the data 720, compared to using fifteen tiles, which may exceed the storage capacity of the internal memory 410 or 521, to process the data 710. That is, when the input data 720 matches the hardware configuration of the data processing apparatus 400 or 520, an inefficient section does not occur while the processor 420 or 522 process the data 720. In an example, the inefficient section may correspond to when a total number of tiles for processing data exceeds a total number of tiles that may be stored at a same time in the internal memory 410 or 521.

As described above with reference to FIG. 7, the number of operation cycles performed by the processor 420 or 522 to process the data 720 when the data 720 is input to the data processing apparatus 400 or 520 is less than the number of operation cycles performed by the processor 420 or 522 to process the data 710 when the data 710 is input to the data processing apparatus 400 or 520. Thus, the processor 420 or 522 may manipulate input data to match the hardware configuration (e.g., the internal memory 410 or 521) of the data processing apparatus 400 or 520. For example, when data 710 is input to the data processing apparatus, the processor 420 or 522 may generate data 720 by adjusting the data 710 and process the data 720, such that the processor 420 or 522 may process the data 720 using less operation cycles. When the processor 420 or 522 processes data corresponding to the neural network, the processor 420 or 522 may adjust the input data by adjusting a layer parameter corresponding to the input data.

Examples of a layer parameter adjusted by the processor 420 or 522 will be described with reference to FIG. 8 below.

Figure 8:
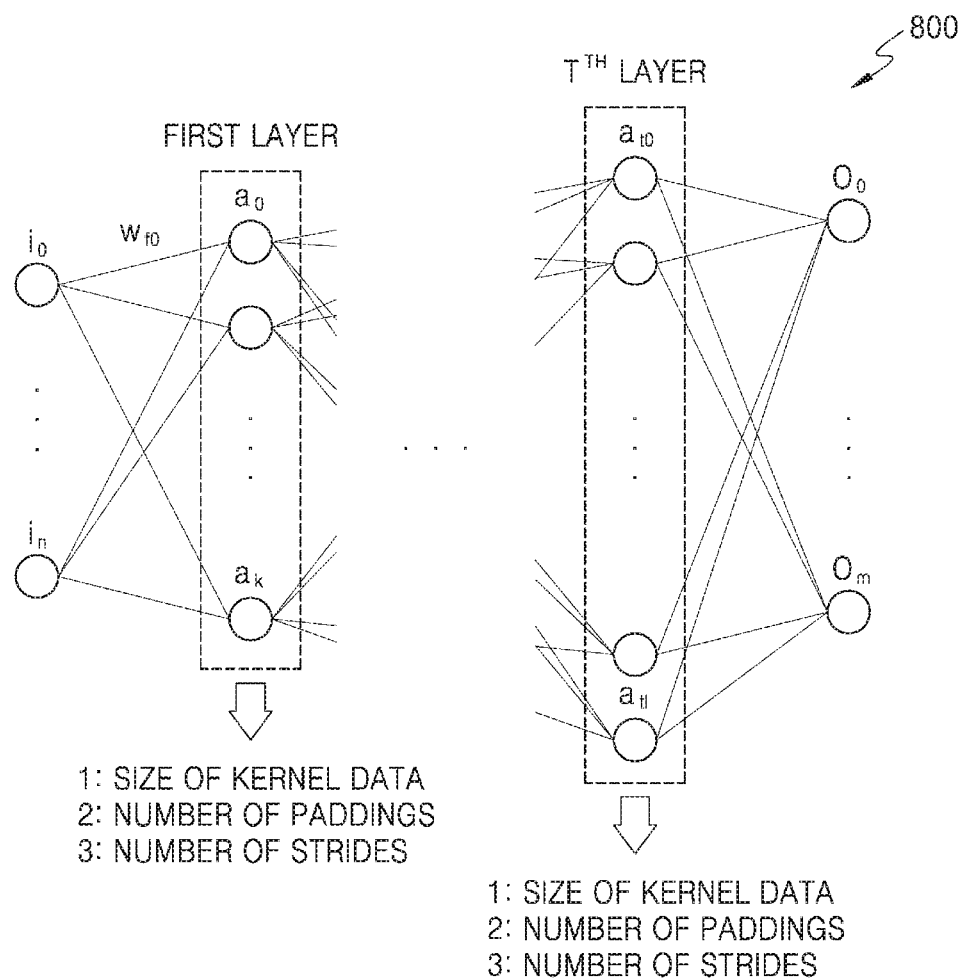
FIG. 8 illustrates layer parameters according to one or more embodiments.

FIG. 8 illustrates layer parameters according to one or more embodiments.

FIG. 8 illustrates an example of a neural network 800. For convenience of explanation, the neural network 800 is illustrated, in which m pieces of output data are generated from n pieces of input data passing through t layers (here, n, t, m are natural numbers). For example, through the neural network 800, convolution operations may be performed on first input feature map data $i_0, \ldots, i_n$ (i.e., input data) through one or more layers, thereby generating final output feature map data $o_0, \ldots, o_m$ (i.e., output data). Here, each convolution operation may include a process of generating respective output feature map data by performing an addition operation on the products of respective input feature map data and respective kernel data at each layer and applying a ReLU activation function to the result of each addition operation.

For example, intermediate output feature map data $a_0, \ldots, a_k$ may be generated by performing the respective operation on the first input feature map data $i_0, \ldots, i_n$ and kernel data. The intermediate output feature map data $a_0, \ldots, a_k$ may be used as input feature map data at a next layer, and a such above-described convolution operation may be performed thereon. Through this process, the final output feature map data $o_0, \ldots, o_m$ may be finally generated.

Each of first to $t^{th}$ layers of the neural network 800 may include at least one layer parameter. For example, the at least one layer parameter may include at least one of the size of kernel data, the number of paddings, or the number of strides at a corresponding layer. The size of the kernel data may refer to the number of 2D values, or width and height of the corresponding 2D kernel.

The at least one layer parameter may be predetermined according to the design of the neural network 800. In other words, the respective sizes of the kernel data, numbers of paddings, and number of strides for each of the first to $t^{th}$ layers may be predetermined, e.g., through use of training data and back propagation kernel value adjustments. Accordingly, the processor 420 or 522 may predict an inefficient section in the neural network 800 by considering the predetermined at least one layer parameter.

As described above with reference to FIG. 7, the number of operation cycles for processing input data (e.g., input feature map data) may be reduced or minimized when the size of the input data matches the hardware configuration (e.g., the size of eight tiles) of the data processing apparatus 400 or 520.

Accordingly, the processor 420 or 522 may predict whether there is an inefficient section in the layers (the first to $t^{th}$ layers) by taking into consideration the predetermined at least one layer parameter and the hardware configuration (e.g., the size of eight tiles) of the data processing apparatus 400 or 520. In other words, the processor 420 or 522 may identify whether there is an inefficient section, based on the respective number of operation cycles of each of the layers (the first to $t^{th}$ layers).

Referring back to FIG. 6, in operation 620, the processor 420 or 522 may adjust a layer parameter related to the inefficient section (e.g., in response to predicting an inefficient section in operation 610).

As an example, the processor 420 or 522 may adjust a layer parameter to increase the size of a kernel data related to the inefficient section. As another example, the processor 420 or 522 may adjust a layer parameter to decrease a number of paddings of a feature map data related to the inefficient section. As another example, the processor 420 or 522 may adjust a layer parameter to increase a number of strides of a feature map data related to the inefficient section.

As described above with reference to FIG. 8, a layer parameter may include the size of a kernel data, a number of paddings and/or a number of strides at a corresponding layer. For example, the processor 420 or 522 may identify output feature map data with respect to each of the layers of the neural network by using the respective predetermined layer parameters. For example, the processor 420 or 522 may identify output feature map data according to Equation 1 below.

$$O_{conv} = \left\lfloor \frac{I - K + 2P}{S} + 1 \right\rfloor \qquad \text{Equation 1}$$

In Equation 1 above, $O_{conv}$ represents an output feature map data. In addition, K represents a size of a kernel data, P represents a number of paddings, and S represents a corresponding number of strides.

An inefficient section may occur because the size of the output feature map data of a certain layer is larger than the hardware configuration is capable of storing at a same time. For example, because the output feature map data of the certain layer is used as input feature map data of a subsequent layer, an inefficient section may occur when the output feature map data of the certain layer is larger than the hardware configuration is capable of storing at a same time.

In this case, the processor 420 or 522 may reduce the size of the output feature map data to adjust the layer parameter. Referring to Equation 1 above, the processor 420 or 522 may reduce the size of output feature map data by increasing the size of the kernel data, reducing the number of the paddings, and/or increasing the number of the strides for that layer.

For example, the processor 420 or 522 may increase the size of the kernel data by performing zero padding on the kernel data, thereby increasing the size of the kernel. An example in which the processor 420 or 522 increases the size of kernel data will be described with reference to FIG. 9 below.

Figure 9:
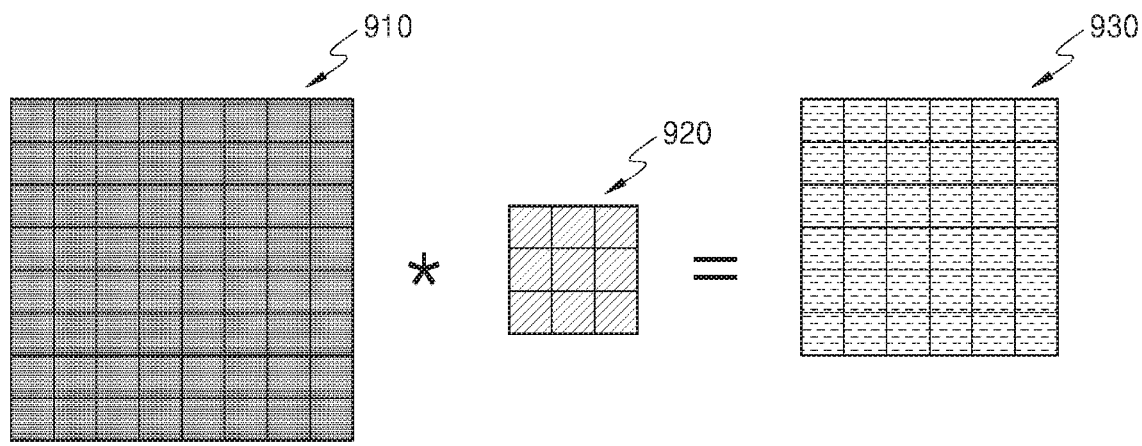
FIG. 9 illustrates a processor increasing a size of kernel data according to one or more embodiments.
Figure 9:
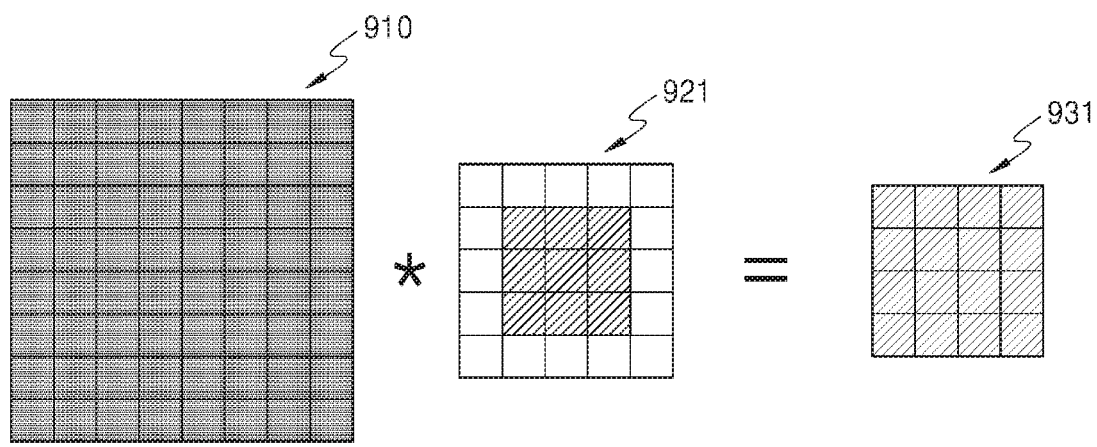

FIG. 9 illustrates a processor increasing a size of kernel data according to one or more embodiments.

FIG. 9 illustrates examples of input feature map data 910 and kernel data 920. The input feature map data 910, output feature map data 930, and zero-padded kernel data 921 illustrated in FIG. 9 are merely examples. That is, the input feature map data 910, the output feature map data 930, and the zero-padded kernel data 921 may be changed within a range not departing from the principle of zero padding.

The processor 420 or 522 may increase the size of the kernel data 920 in an inefficient section. Accordingly, the size of the output feature map data 930 may be reduced.

The processor 420 or 522 may increase the size of the kernel data 920 by performing zero padding on the kernel data 920. Here, zero padding refers to inserting zeros into the kernel data 920.

When the input feature map data 910 of FIG. 9 is an 8×8 matrix and the kernel data 920 is a 3×3 matrix, the output feature map data 930 may be generated to be a 6×6 matrix (e.g., wherein a stride value is 1).

The processor 420 or 522 may generate the kernel data 921, which is a 5×5 matrix, by respectively inserting two zeros as an x-coordinate component and an y-coordinate component into the kernel data 920. In this case, when an addition operation is performed on the products of the input feature map data 910 and the zero-padded kernel data 921 is calculated, output feature map data 931 may be output as a 4×4 matrix. Thus, the size of the output feature map data 931 may be smaller than that of the output feature map data 930. That is, the processor 420 or 522 may increase the size of the kernel data 920, and as a result, the size of the output feature map data 931 may be reduced. In an example, output feature map data 931 may be For convenience of description, it is described above with reference to FIG. 9 that two zeros are respectively inserted as an x-coordinate component and a y-coordinate component into the kernel data 920. However, the number of zeros inserted into the kernel data 920 may vary according to the hardware configuration of the data processing apparatus 400 or 520. In other words, the size of the zero-padded kernel data 921 may be adjusted such that an inefficient section may be eliminated.

In addition, zero padding may be alternatively or additionally performed on the input feature map data 910 such that an inefficient section may be eliminated.

In operation 630, the processor 420 or 522 may process data based on the adjusted layer parameter adjusted in operation 620.

For example, the processor 420 or 522 may perform an addition operation on the products of the adjusted kernel data and the input feature map data. Accordingly, the number of operation cycles in a process performed in the neural network may be minimized and operational efficiency of the data processing apparatus 400 or 520 may be increased.

As the operation is performed on the adjusted kernel data and the input feature map data, the same effect as when the output feature map data is cropped may be achieved. Here, the cropping of the output feature map data may refer to removing unnecessary data from the output feature map data. An effect of cropping the output feature map data will be described in detail with reference to FIG. 10 below.

Figure 10A:
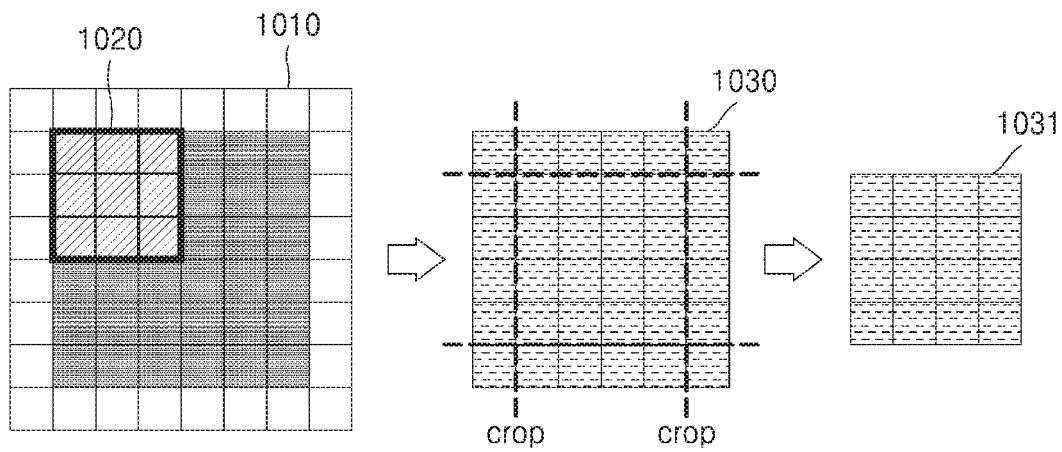
FIGS. 10A and 10B illustrate an effect of cropping occurring in output feature map data according to one or more embodiments.
Figure 10B:
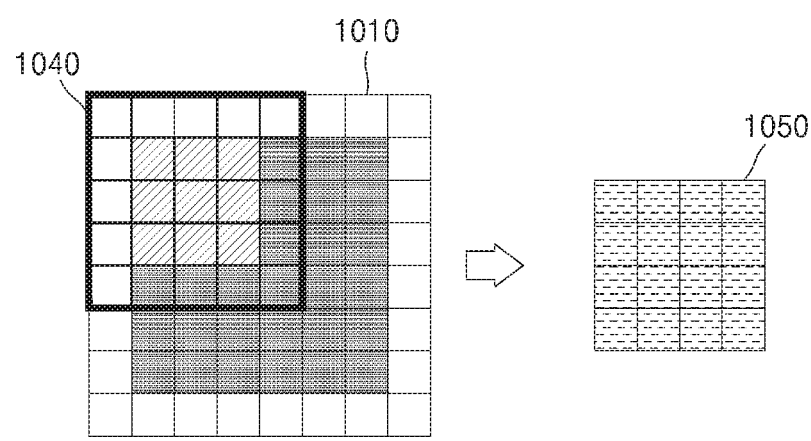

FIGS. 10A and 10B illustrate an effect of cropping occurring in output feature map data according to one or more embodiments.

FIG. 10A illustrates input feature map data 1010, kernel data 1020, and output feature map data 1030. In order to secure appropriate output data of a neural network, the input feature map data 1010 may be zero-padded.

The output feature map data 1030 may be generated by performing an operation on the input feature map data 1010 and the kernel data 1020. For example, the output feature map data 1030, which is a 6×6 matrix, may be generated by performing an addition operation on the products of the input feature map data 1010, which is an 8×8 matrix, and the kernel data 1020, which is a 3×3 matrix.

In this case, unnecessary information may be included in the output feature map data 1030. For example, when the input feature map data 1010 is zero-padded, outermost elements of the output feature map data 1030 may be determined to correspond to unnecessary information. Thus, in general, cropping may be performed to remove the outermost elements of the output feature map data 1030, thereby generating the output feature map data 1031.

FIG. 10B illustrates input feature map data 1010 and adjusted kernel data 1040. For example, the adjusted kernel data 1040 may be a result of performing zero padding on the kernel data 1020. Referring to FIG. 10B, output feature map data 1050, which is a 4×4 matrix, may be generated by performing an addition operation on the products of the input feature map data 1010, which is an 8×8 matrix, and the adjusted kernel data 1040, which is a 5×5 matrix.

Referring to FIGS. 10A and 10B, the output feature map data 1031 is the same as the output feature map data 1050. In other words, as the size of the kernel data 1040 is adjusted and an operation is performed on the adjusted kernel data 1040 and the input feature map data 1010, the same data as the actual output feature map data 1031, which is the result of cropping the output feature map data 1030, may be generated.

Figure 11:
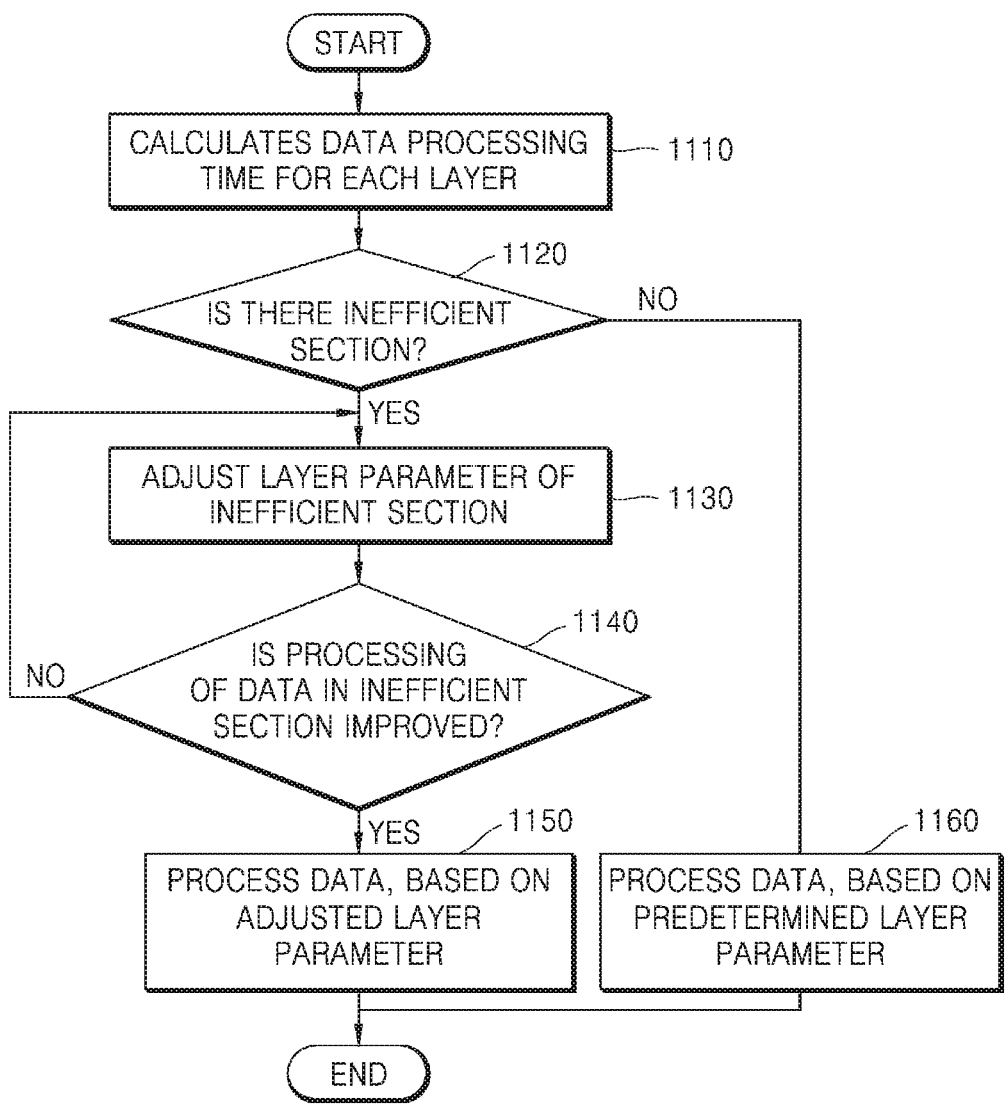
FIG. 11 illustrates a method of processing data according to one or more embodiments.

FIG. 11 illustrates a method of processing data according to one or more embodiments.

Referring to FIG. 11, the method of processing data may include operations performed in a time series by the data processing apparatus 400 of FIG. 4 or the data processing apparatus 520 of FIG. 5. Therefore, the above description of the data processing apparatuses 400 and 520 of FIGS. 4 and 5 may also apply to the method of processing data of FIG. 11.

In operation 1110, the processor 420 or 522 may calculate a data processing time for each layer of a neural network.

For example, the processor 420 or 522 may calculate the data processing time by using a predetermined layer parameter for each layer. The processor 420 or 522 may calculate output feature map data by using data (e.g., tiles) stored in the internal memory 410 or 521. In this case, as a utilization rate (including recycling) of the data stored in the internal memory 410 or 521 decreases, the number of times the processor 20 or 522 accesses the external memory 510 may increase. Therefore, the data processing time of the processor 420 or 522 may increase.

In operation 1120, the processor 420 or 522 may identify whether there is an inefficient section during data processing based on the data processing time calculated in operation 1110. Thus, the processor 420 or 522 may identify whether there is an inefficient section by calculating a time required to process data corresponding to a neural network by using a predetermined layer parameter. In other words, the processor 420 or 522 may identify whether there is an inefficient section during data processing, based on the hardware configuration of the data processing apparatus 400 or 520. In an example, in operation 1120, the processor 420 or 522 may identify that there is an inefficient section during data processing in response to the data processing time calculated in operation 1110 being greater than or equal to a predetermined threshold.

In operation 1120, the processor 420 or 522 may identify whether there is an inefficient section during data processing. The method proceeds to operation 1130 when there is an inefficient section and proceeds to operation 1160 when there is an inefficient section.

In operation 1130, the processor 420 or 522 may adjust a layer parameter of the inefficient section.

The inefficient section identified in operation 1110 may be a section in which unnecessary operation cycles (e.g., the operation cycles are greater than or equal to a predetermined threshold) occur during data processing. As described above with reference to FIG. 7, the number of operation cycles for processing input data (e.g., input feature map data) may be minimized when the size of the input data matches the hardware configuration (e.g., the size of tiles) of the data processing apparatus 400 or 520.

The processor 420 or 522 may adjust the layer parameters such that the size of the input data matches the hardware configuration of the data processing apparatus 400 or 520. As an example, the processor 420 or 522 may adjust the layer parameter to increase the size of kernel data related to the inefficient section. As another example, the processor 420 or 522 may adjust the layer parameter to decrease the number of paddings of feature map data related to the inefficient section. As another example, the processor 420 or 522 may adjust the layer parameter to increase the number of strides of the feature map data related to the inefficient section.

In operation 1140, the processor 420 or 522 may identify whether data processing in the inefficient section is improved based on the adjusted layer parameter (e.g., by calculating the number of operation cycles for processing input data.

For example, the processor 420 or 522 calculates a data processing time, based on the adjusted layer parameter. In addition, the processor 420 or 522 may identify whether the data processing in the inefficient section is improved by comparing the data processing time calculated in operation 1110 with the data processing time calculated in operation 1140. For example, when the number of operation cycles in operation 1140 is less than the number of operation cycles in operation 1110, the processor 420 or 522 may identify that the data processing in the inefficient section is improved.

The method may proceed to operation 1150 when the data processing in the inefficient section is improved, and proceed to operation 1130 when the data processing in the inefficient section is not improved.

In operation 1150, the processor 420 or 522 may process data, based on the adjusted layer parameter. For example, the processor 420 or 522 may perform an addition operation on the products of the adjusted kernel data and the input feature map data. Accordingly, the number of operation cycles in a process performed in the neural network may be minimized, and operational efficiency of the data processing apparatus 400 or 520 may be increased. In addition, as an operation is performed on the adjusted kernel data and the input feature map data, the same effect as when the output feature map data is cropped may be achieved.

In operation 630, the processor 420 or 522 may process the data, based on the adjusted layer parameter. For example, the processor 420 or 522 may perform an addition operation on the products of the adjusted kernel data and the input feature map data.

As described above, as the data processing apparatus 400 or 520 adjusts the layer parameters, the size of the data to be processed may be matched to hardware configuration and thus an inefficient section (i.e., a section in which an operation is inefficiently performed) may be improved during processing of the data. In addition, as the data processing apparatus 400 or 520 adjusts the layer parameter, the same effect as when feature map data is cropped may be achieved.

The data processing apparatuses, neural network systems, processors, internal memories, external memories, data processing apparatus 400, internal memory 410, processor 420, neural network system 5, external memory 510, data processing apparatus 520, internal memory 521, processor 522, and other apparatuses, units, modules, devices, and other components described herein with respect to FIGS. 1-11 are implemented by or representative of hardware components. Examples of hardware components that may be used to perform the operations described in this application where appropriate include controllers, sensors, generators, drivers, memories, comparators, arithmetic logic modules, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic module, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-11 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented data processing method, the method comprising:
predicting whether there will be an inefficient section, of a neural network set to be implemented, during a processing of data, based on an output size of the section and a hardware configuration for processing the data;
adjusting a layer parameter corresponding to the inefficient section of the neural network; and
performing the processing of the data using the neural network with the adjusted layer parameter such that the output size corresponds to a data size of the hardware configuration.

2. The method of claim 1, wherein the data size of the hardware configuration corresponds to a data size of a memory.

3. The method of claim 1, wherein the layer parameter comprises any one or any combination of any two or more of a size of kernel data, a corresponding number of paddings, and a corresponding number of strides.

4. The method of claim 1, wherein the adjusting of the layer parameter comprises adjusting the layer parameter by increasing a size of kernel data corresponding to the inefficient section.

5. The method of claim 1, wherein the adjusting of the layer parameter comprises adjusting the layer parameter by decreasing a number of paddings of feature map data, to be input to a next layer of the neural network, corresponding to the inefficient section.

6. The method of claim 1, wherein the adjusting of the layer parameter comprises adjusting the layer parameter by increasing a number of strides for convolution of feature map data corresponding to the inefficient section.

7. The method of claim 1, wherein
the predicting of whether there will be the inefficient section during processing of the data comprises determining whether there will be the inefficient section based on predetermined layer parameters including the layer parameter, and
each of the predetermined layer parameters corresponds to a respective layer among layers of the neural network at which the data is to be processed.

8. The method of claim 1, further comprising determining whether a processing of the data in the inefficient section is improved based on the processing of the data with the adjusted layer parameter.

9. The method of claim 1, wherein the data comprises feature map data corresponding to an input image, and the processing of the data comprises identifying features of the input image by performing a convolution operation with the adjusted layer parameter.

10. A non-transitory computer-readable storage medium storing instructions that, when executed by one or more processors, configure the one or more processors to perform the method of claim 1.

11. The method of claim 2, wherein the data size of the memory comprises a set number of tile data blocks.

12. The method of claim 4, wherein the increasing of the size of the kernel data comprises increasing the size of the kernel data by performing zero padding on the kernel data.

13. The method of claim 7, wherein the predicting of whether there will be the inefficient section during processing of the data comprises determining whether there will be the inefficient section based on a determined number of operation cycles at each of the layers.

14. The method of claim 8, wherein the determining of whether the processing of the data in the inefficient section is improved comprises comparing:
a first number of operation cycles to process the data in one or more layers of the neural network using the layer parameter; and
a second number of operation cycles to process the data in the one or more layers of the neural network with the adjusted layer parameter.

15. The method of claim 11, wherein the inefficient section corresponds to a layer of the neural network in which the output size of the section, being a data size of a generated feature map, exceeds the set data size of the set number of tile data blocks.

16. The method of claim 14, wherein the determining of whether the processing of the data in the inefficient section is improved comprises determining the processing of the data in the inefficient section is improved in response to the first number of operation cycles being greater than the second number of operation cycles.

17. A data processing apparatus, the apparatus comprising:
one or more processors configured to
predict whether there will be an inefficient section, of a neural network set to be implemented, during a processing of data, based on an output size of the section and a hardware configuration for processing the data,
adjust a layer parameter corresponding to the inefficient section of the neural network, and
perform the processing of the data using the neural network with the adjusted layer parameter such that the output size corresponds to a data size of the hardware configuration.

18. The apparatus of claim 17, wherein the data size of the hardware configuration corresponds to a data size of a memory.

19. The apparatus of claim 17, wherein the layer parameter comprises any one or any combination of any two or more of a size of kernel data, a number of paddings, and a number of strides.

20. The apparatus of claim 17, wherein, for the adjusting of the layer parameter, the one or more processors are configured to adjust the layer parameter by increasing a size of kernel data corresponding to the inefficient section.

21. The apparatus of claim 17, wherein, for the adjusting of the layer parameter, the one or more processors are configured to adjust the layer parameter by decreasing a number of paddings of feature map data corresponding to the inefficient section.

22. The apparatus of claim 17, wherein, for the adjusting of the layer parameter, the one or more processors are configured to adjust the layer parameter by increasing a number of strides of feature map data corresponding to the inefficient section.

23. The apparatus of claim 17, wherein, for the predicting of whether there will be the inefficient section, the one or more processors are configured to determine whether there will be the inefficient section based on predetermined layer parameters including the layer parameter, and
each of the predetermined layer parameters corresponds to a respective layer among layers of the neural network at which the data is to be processed.

24. The apparatus of claim 17, wherein the one or more processors are configured to determine whether the processing of the data in the inefficient section is improved based on the processing of the data with the adjusted layer parameter.

25. The apparatus of claim 17, wherein
the apparatus is any one of a personal computer (PC), a server device, a mobile device, a smart phone, a tablet device, an augmented reality (AR) device, an internet-of-things (IoT) device, an autonomous vehicle, a robotics device, and a medical device, and
the one or more processors are configured to perform any one of voice recognition, vision recognition, and image classification based on a result of the processing of the data.

26. The apparatus of claim 17, further comprising a memory storing instructions that, when executed by the one or more processors, configure the one or more processors to perform the predicting of whether the inefficient section will be generated, the adjusting of the neural network layer parameter, and the processing of the data.

27. The apparatus of claim 20, wherein, for the increasing of the size of the kernel data, the one or more processors are configured to increase the size of the kernel data by performing zero padding on the kernel data.

28. The apparatus of claim 23, wherein, for the predicting of whether there will be the inefficient section, the one or more processors are configured to determine whether there will be the inefficient section based on a determined number of operation cycles at each of the layers.

29. A processor-implemented data processing method, the method comprising:
predicting whether an inefficient section will be generated during a processing of data in a layer of a neural network, based on a determined number of operation cycles for the processing of the data in the layer;
in response to predicting the inefficient section will be generated, adjusting a parameter of the layer, such that a data size of a feature map generated in the layer based on the data does not exceed a data size of a set number of tile data blocks in a memory; and
processing the data in the layer with the adjusted layer parameter to generate the feature map.

* * * * *